(12) United States Patent
Zheng et al.

(10) Patent No.: US 10,811,978 B1
(45) Date of Patent: Oct. 20, 2020

(54) MULTI-MODE CONTROL FOR MULTI-OUTPUT VOLTAGE POWER CONVERTER

(71) Applicant: DIALOG SEMICONDUCTOR INC., Campbell, CA (US)

(72) Inventors: Cong Zheng, Campbell, CA (US); Jing Guo, Campbell, CA (US); Chien-Liang Chen, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 16/450,473

(22) Filed: Jun. 24, 2019

(51) Int. Cl.
*H02M 3/335* (2006.01)

(52) U.S. Cl.
CPC ... *H02M 3/33507* (2013.01); *H02M 3/33592* (2013.01)

(58) Field of Classification Search
CPC ............. H02M 3/335; H02M 3/33507; H02M 3/33515; H02M 3/33523; H02M 3/33576; H02M 3/33592
See application file for complete search history.

(56) References Cited

U.S. PATENT DOCUMENTS

| | | | |
|---|---|---|---|
| 8,873,254 B2* | 10/2014 | Morris | H02M 3/335 363/21.14 |
| 10,003,269 B2* | 6/2018 | Shi | H02M 1/08 |
| 2018/0083538 A1* | 3/2018 | Kong | H02M 1/44 |
| 2019/0229626 A1* | 7/2019 | Phadke | H02M 3/33523 |

* cited by examiner

*Primary Examiner* — Matthew V Nguyen
(74) *Attorney, Agent, or Firm* — Haynes and Boone, LLP

(57) ABSTRACT

An adaptive pulse width modulation threshold is provided for a flyback converter that controls the transition between the pulse frequency mode of operation and the pulse width modulation mode of operation. The adaptive pulse width modulation mode is adapted responsive to an output voltage for the flyback converter.

17 Claims, 4 Drawing Sheets

MULTI-MODE CONTROL FOR MULTI-OUTPUT VOLTAGE POWER CONVERTER

TECHNICAL FIELD

This application relates to isolated switching converters, and more particularly to an isolated switching power converter that adapts the transitions between pulse width modulation and pulse frequency modulation modes of operation responsive to the output voltage.

BACKGROUND

Power adapters used to power and recharge the battery for portable equipment were traditionally designed and optimized for a specific device. For example, cell phone adapters were typically designed with a constant voltage of +5V and a constant current range in the order of 1A. Laptop adapters were typically designed with a constant voltage of +19V and a constant current range in the order of 2A. In other words, power adapter designers were able to optimize around narrow operating conditions of input line voltage and output voltage and current ranges.

A common topology that is employed in portable equipment adapters is a flyback (or flyback variant) power converter operating in the discontinuous conduction mode (DCM). Generally, there are typically three modulation regions, including pulse-width-modulation (PWM) for higher load conditions, pulse-frequency-modulation (PFM) for light to medium load conditions, and a deep PFM (DPFM) with pulse skipping mode for light to no-load condition. The pulse skipping mode can sometimes include a method to avoid audible switching frequencies. The power converter control and power conversion components are optimized for the specific output voltage and line/load range. For example, the operating points for the transitions between PWM to PFM are well defined. Similarly, the operating point at which the converter transitions between the DCM (discontinuous conduction mode) and the CDCM (critical discontinuous conduction mode) is well defined. However, a new trend is emerging in which power adapters are capable of operating over a wide range of operating parameters such as maximum output power, output voltage and current. Unfortunately, prior art control techniques are unable to optimize efficiency performance across the wider operating conditions.

Efficiency of a switching power converter is governed largely by two types of loss: switching loss and conduction loss. In most switching power converters, switching loss plays a greater role as the load across the output of the power converter is decreased. Conversely, conduction loss plays a greater role as the load is increased. As mentioned above, to reduce loss at both high load conditions and light load conditions, some conventional switching power converters use pulse width-modulation (PWM) and pulse-frequency-modulation (PFM) at different load conditions. PWM mode is generally more efficient than PFM mode at higher load conditions. PFM mode is generally more efficient than PWM mode at lower load conditions. This multi-modulation technique is generally referred to as multi-mode control (MMC).

In each of the modulation modes, the maximum primary winding current (Ipk) for each on-time of the power switch transistor depends on the transformer design to avoid core saturation. For different operation condition, it would be beneficial to fully utilize the designed Ipk range. In power supply adapter applications with multiple output voltage levels, lower Vout settings result in longer transformer reset time (Trst), hence forcing operation to enter CDCM. If the system enters CDCM during PFM mode where Ipk is fixed and Fsw is also fixed, the power converter is unable to maintain output voltage regulation.

A conventional MMC curve that is followed for all output voltage conditions and load conditions is shown in FIG. 1, which shows the switching frequency Fsw for the power switch transistor as a function of the output power as represented by a control voltage produced by the feedback loop in the isolated switching power converter. At an output power P1, the modulation mode switches from a deep pulse width modulation (DPWM) mode to a pulse frequency modulation (PFM) mode. As the output power increases to a level P2, the modulation mode switches from PFM to a PWM mode. During PFM operation, each power switch cycle produces a fixed peak current (Ipk) in the primary winding of the converter's transformer. This peak current varies linearly during the PWM and DPWM modes. The converter's output current is usually fixed in each power supply design, hence lower Vout corresponds to lower output power. With this method, at a low output full load condition, Fsw is high and Ipk is low, which doesn't fully utilize the designed Ipk range, hence efficiency is compromised.

Alternatively, due to the wide operating conditions of multi-voltage adapters, some prior art converters have employed a continuous conduction mode (CCM) region for higher output load conditions. This method allows the system to enter CCM (instead of operating in the CDCM for lower Vout settings and higher load conditions). When the system enters CCM during PFM mode, Ipk is fixed and Fsw can be adjusted, allowing Vc to maintain output voltage regulation. Unfortunately, the use of CCM requires complex feedback loop compensation and increased switch turn-on loss compared to CDCM operation.

SUMMARY

A flyback converter including a primary-side controller is disclosed that includes: a threshold voltage module configured to convert a sampled output voltage signal for the flyback converter into an adaptive control voltage threshold; a logic circuit configured to activate a pulse width modulation mode for the flyback converter responsive to a control voltage being greater than the adaptive control voltage threshold; a switching frequency generator configured to generate a switching frequency command to equal a constant value while the pulse width modulation mode is active; and a peak voltage generator configured to generate a peak voltage responsive to the control voltage while the pulse width modulation mode is active, wherein the primary-side controller is configured to control a cycling of a power switch transistor to have a switching frequency responsive to the switching frequency command and to have a pulse width responsive to the peak voltage.

In addition, a method of operation for a flyback converter is disclosed that includes: converting an output voltage for the flyback converter into an adaptive control voltage threshold that varies with the output voltage; and modulating a power switch for the flyback converter in a pulse width modulation mode responsive to a control voltage for the flyback converter being greater than the adaptive control voltage threshold.

These advantageous features may be better appreciated through a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

An adaptive multi-mode control (MMC) methodology for a switching power converter is disclosed that adjusts the transition point between PFM and PWM operation as a function of the output voltage to enable the switching power converter to maintain CDCM operation and avoid entering CCM. This allows the operating efficiency to remain high over a wider range of operating conditions and to ease the feedback loop compensation design. Additionally, it allows the ability to maintain zero-voltage-switching (ZVS) or quasi-resonant (QR) switching, further lowering switching losses and EMI.

The MMC methodology will first be discussed for an optocoupler-based feedback system in which a secondary-side controller directly senses the output voltage and compares it with a reference voltage to form an error signal. The secondary-side controller filters the error signal to form a secondary-side control signal (an input diode current to the optocoupler). The optocoupler produces a primary-side collector current that is a function of a product of the current transfer ratio (CTR) gain for the optocoupler and the input diode current. The collector current is transformed into a control voltage (Vc). A primary-side controller regulates the switching of a power switch transistor responsive to the control voltage.

Figure 1:
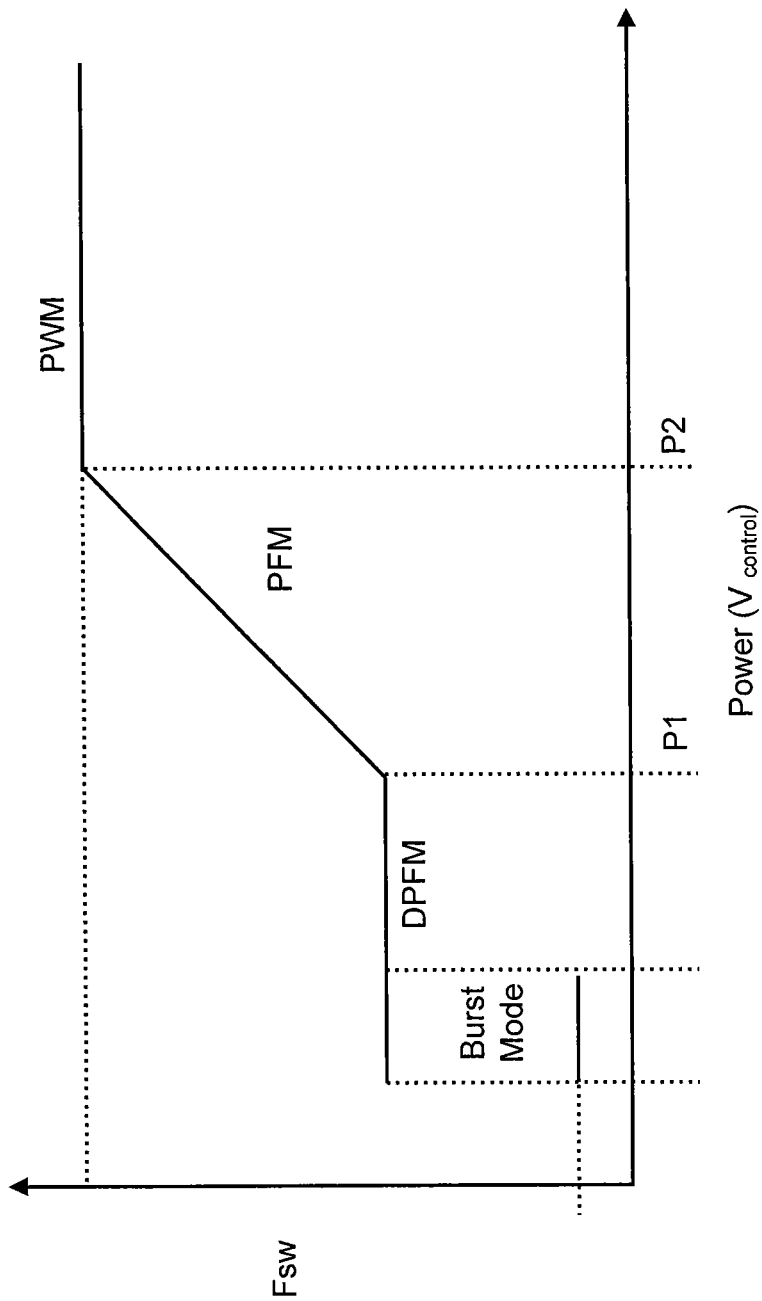
FIG. 1 is a graph of the switching frequency as a function of the output power for a flyback converter with conventional multi-mode control.
Figure 2:
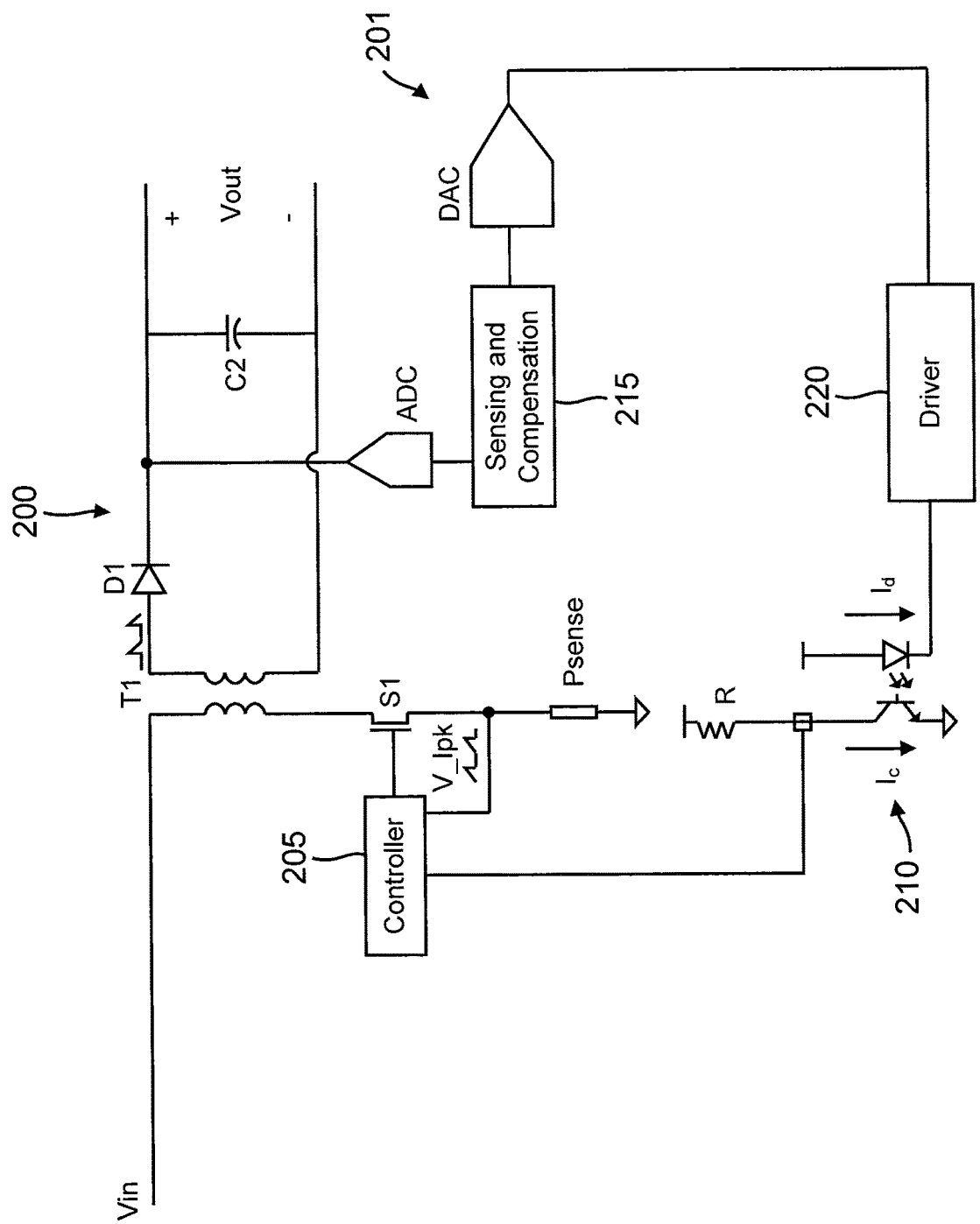
FIG. 2 is a diagram of a flyback converter having an adaptive transition between the pulse frequency mode of operation and a pulse width modulation mode of operation in accordance with an aspect of the disclosure.

An example flyback converter 200 with optocoupler-based feedback is shown in FIG. 2. A primary winding current flows of a transformer T1 based upon its magnetizing inductance and an input voltage Vin during the on-time of a power switch transistor S1. While the primary winding current flows, an output diode D1 prevents the secondary winding current from conducting. Alternatively, flyback converter 200 may include a synchronous rectifier switch transistor for rectifying the secondary winding current. When the power switch closes, the magnetic energy stored in transformer T1 causes the output diode D1 to become forward biased so that the secondary winding current flows to charge an output capacitor C2 with the output voltage.

A secondary-side controller 201 may use either analog or digital feedback techniques to drive a control voltage Vc. In flyback converter 200, secondary-side controller 201 uses digital feedback so the output voltage is digitized by an analog-to-digital (ADC) converter. The digitized output voltage is processed by a sensing and compensation module 215 that compares the digitized output voltage to a desired reference value to form an error signal that is compensated to form a digital control signal. A digital-to-analog converter (DAC) converts the digital control signal into an analog voltage. A driver 220 drives a diode current Id into an optocoupler 210 responsive to the analog voltage. Based upon the CTR gain, optocoupler 210 produces a collector current Ic that is converted by a resistor R into the control voltage Vc.

A primary-side controller 205 modulates the switching of power switch transistor S1 responsive to the control voltage. To modulate the switching during a pulse frequency modulation mode of operation, controller 205 determines a peak primary winding current based upon the control voltage. The primary winding current flows through a sense resistor Rsense to develop a voltage V_ipk that is product of the sense resistor voltage and the primary winding current. Controller 105 may thus calculate a peak value for V_ipk based upon the desired peak primary winding current. In each PWM switching cycle, controller 105 would then shut off power switch transistor S1 when the peak voltage V_ipk is satisfied.

During a PFM mode of operation, controller 205 also determines a switching frequency Fsw for the cycling of power switch transistor S1 as a function of the control voltage. The transition from the PFM mode of operation to the PWM mode of operation is based upon a function of the output power as represented by the control voltage. Note that the production of the control voltage may be either proportional to the optocoupler collector current or inversely proportional to the optocoupler collector current. The use of the control voltage as a proxy for the output power as disclosed herein thus takes into account whether the control voltage is proportional or inversely proportional to the output power. Regardless of the proportionality, controller 205 compares the control voltage to a PFM-to-PWM threshold value to determine whether the modulation should be according to the PFM mode or to the PWM mode.

To provide an advantageous adaptive multi-mode control, controller 205 adapts the PFM-to-PWM threshold based upon the output voltage. With optocoupler-based feedback such as shown for flyback converter 200, it is secondary-side controller 201 that has direct knowledge of the output voltage. In one embodiment, secondary-side controller 201 could inform primary-side controller 205 of the output voltage through a message sent through another optocoupler or some other type of ground-isolating communication channel such as a capacitor or a signal transformer. But the use of another optocoupler complicates design and increases costs. Primary-side controller 205 in flyback converter 200 thus uses primary-only feedback techniques to sense the output voltage at the transformer reset time. Such primary-only sensing of the output voltage is well-known in the flyback converter arts and will thus not be discussed in detail herein.

Figure 3:
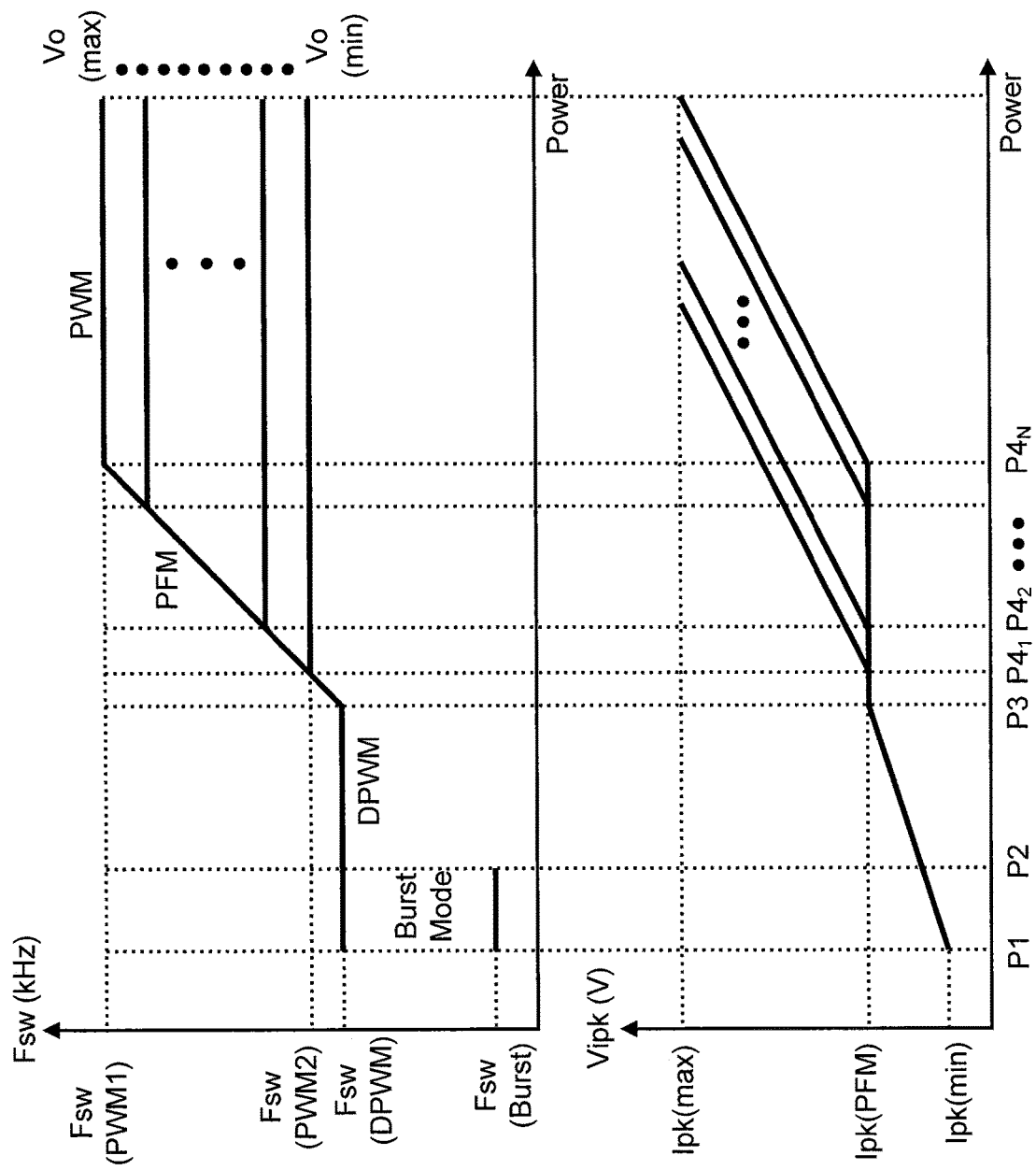
FIG. 3 is graph of the switching frequency and the peak voltage Vipk as a function of the output power for the flyback converter of FIG. 2.

The resulting adaptive MMC as implemented by primary-side controller 205 may be better appreciated through a consideration of the waveforms shown in FIG. 3, which includes a graph of both the switching frequency Fsw and the peak voltage V_ipk as a function of the output power. As noted earlier, the control voltage is used as a proxy for the output power. Thus the output power axis may also be considered to be a control voltage axis for embodiments in which the control voltage is proportional to the optocoupler collector current. As the output power rises to a level P1, the burst mode is invoked by primary-side controller 205. During the burst mode the power switch cycles bursts occur according to a burst switching frequency. The peak primary current Ipk rises from a minimum value of Ipk(min) as the output power rises from level P1. Within a burst, the power switch cycles occur at a deep PWM (DPWM) switching frequency. As the output power rises to a level P2, primary-side controller 205 enters the DPWM mode so that the switching frequency is the DPWM frequency. The peak primary current continues to rise with the output power in the DPWM mode. At an output power P3, primary-side controller 205 switches from the DPWM mode to the PFM mode. The peak current is maintained at the PFM level during the PFM mode regardless of the output power change. The switching frequency rises with the output power during the PFM mode.

Figure 4:
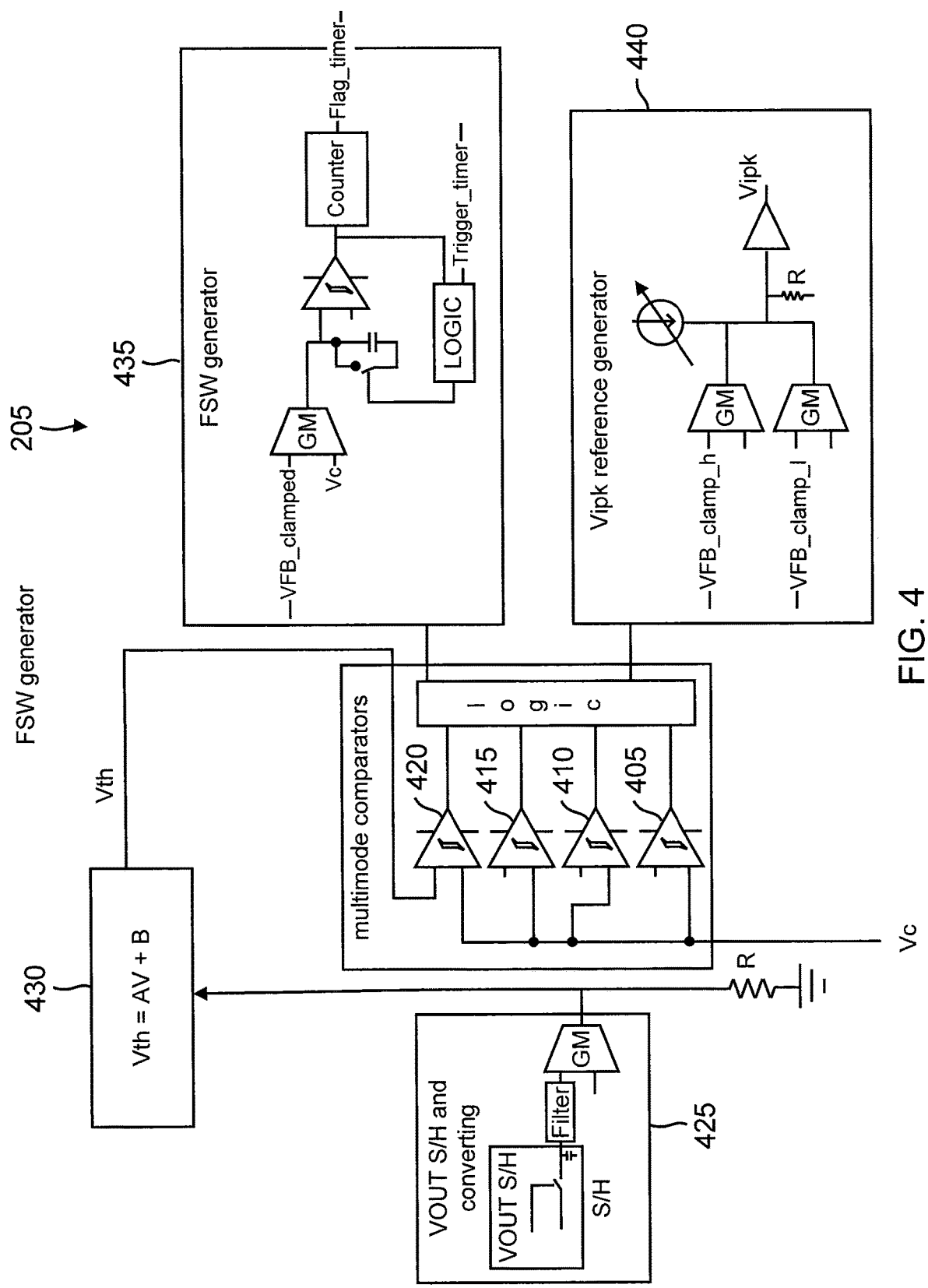
FIG. 4 is a diagram of the primary-side controller in the flyback converter of FIG. 2.

Note that the transitions at output power levels P1, P2, and P3 are independent of the output voltage. Referring now to FIG. 4, primary-side controller 205 thus includes a first comparator 405 that compares the control voltage Vc to a first threshold to control the transition into burst mode at power level P1. Similarly, primary-side controller 205 includes a comparator 410 that compares the control voltage Vc to a second threshold to control the transition from burst mode into the DPWM mode at power level P2. A comparator 415 compares the control voltage to a third threshold to control the transition from DPWM mode to the PFM mode at power level P3. These comparators may include hysteresis to prevent noise from causing excessive transitions between modes. A final comparator 420 compares the control voltage to an adaptive threshold to control the transition from PFM mode to the PWM mode.

As seen in FIG. 3, a power level P4 for the transition from the PFM mode to the PWM mode rises as the output voltage rises and falls as the output voltage falls. This adaptation of the power level P4 occurs across an adaptation range for the output voltage. A first power level $P4_1$ corresponds to the lowest value of Vout for the output voltage adaptation range. A second power level $P4_2$ corresponds to a slightly higher level of Vout, and so on such that a final power level $P4_N$ corresponds to the highest value of Vout for the output voltage adaptation range. Once the PWM mode is entered, the peak primary current increases with power until it is clamped at a maximum Ipk(max) level. The switching frequency for the PWM mode depends upon the adaptation of the power level P4. The first power level $P4_1$ produces the lowest switching frequency (PWM2) in the PWM mode whereas the final power level $P4_N$ produces the highest switching frequency (PWM1).

Referring again to FIG. 4, primary-side controller 205 includes an output voltage sampling and hold module 425 for sampling and holding the output voltage. As discussed earlier, primary-side controller 205 may use primary-only feedback techniques to sample at the transformer reset time to obtain the output voltage. Alternatively, the output voltage may be transmitted from secondary-side controller 201 through a ground-isolating communication channel to sampling and hold module 425. Regardless of how the output voltage is obtained, sample and hold module 425 samples the output voltage such as through a switch S/H. The resulting sampled output voltage is stored across a capacitor to be filtered and then amplified in a transconductance amplifier (gm) with respect to a threshold voltage. The threshold voltage can be some output voltage value within the expected output voltage range. In alternative embodiments, the sampled output voltage itself may be output from sampling and hold module 425.

The output current from the transconductance amplifier is converted into an output voltage V by driving the output current through a resistor R to produce an input voltage to a threshold voltage adaptation module 430 that produces the adaptive threshold for the control voltage to control the PFM-to-PWM transition point. For example, the adaptive threshold may be calculated by threshold voltage adaptation module 430 by using the linear equation of A*V+B, wherein A and B are coefficients. The A coefficient is positive if the control voltage is proportional to the optocoupler collector current. Conversely, the A coefficient is negative if the control voltage is inversely proportional to the optocoupler collector current.

A logic circuit processes the outputs from the multi-mode comparators 405, 410, 415, and 420 to control a switching frequency (FSW) generator 435 and a peak voltage Vipk generator 440. Note that both generators are conventional. It is the threshold between PFM and PWM that is adaptive. During the PFM mode, a transconductance amplifier gm in switching frequency generator 435 generates an output current responsive to the difference between the control voltage and a threshold VFB_clamped. The output current charges a capacitor. A comparator such as with hysteresis compares the capacitor voltage to a threshold to trigger a counter. A logic circuit resets the capacitor by closing a switch. The logic circuit may also respond to a trigger_timer signal. The counter counts a switching period responsive to the triggering from the comparator. As the control voltage rises, the capacitor is charged faster so the switching frequency rises during the PFM mode. In the PWM mode, the control voltage input to the transconductance amplifier is clamped so that the switching frequency is constant. This clamped value corresponds to the value of the control voltage at the adaptive transition between the PFM and PWM modes.

The peak voltage Vipk is constant during the PFM mode. Peak voltage generator 440 is thus active during the burst, DPWM, and PWM modes. The same linear rise for the peak voltage occurs during the burst and DPWM modes so peak voltage generator 440 includes a first transconductance amplifier that amplifies a difference between the control voltage and a lower threshold (VFB_clamp_1) to generate an output current driven into a resistor R. To provide an offset to the voltage developed across the resistor R, the output current is supplemented by a variable current source. The resistor voltage is buffered to produce the peak voltage Vipk. During the PWM mode, the first transconductance amplifier is deactivated. A second transconductance amplifier amplifies the difference between the control voltage and an upper threshold (VFB_clamp_h) to generate the output current driven into the resistor R. With the switching frequency and peak voltage determined for each mode, primary-side controller 205 may proceed to control the cycling of power switch transistor S1 as known in the flyback power converter arts.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A flyback converter including a primary-side controller, wherein the primary-side controller comprises:
   a threshold voltage adaptation module configured to convert a sampled output voltage signal for the flyback converter into an adaptive control voltage threshold;
   a logic circuit configured to activate a pulse width modulation mode for the flyback converter responsive to a control voltage being greater than the adaptive control voltage threshold;
   a switching frequency generator configured to generate a switching frequency command to equal a constant value while the pulse width modulation mode is active; and
   a peak voltage generator configured to generate a peak voltage responsive to the control voltage while the pulse width modulation mode is active, wherein the primary-side controller is configured to control a cycling of a power switch transistor to have a switching frequency responsive to the switching frequency command and to have a pulse width responsive to the peak voltage.

2. The flyback converter of claim 1, wherein the threshold voltage adaptation module is configured to convert the sampled output voltage signal into the adaptive control voltage threshold using a linear equation.

3. The flyback converter of claim 1, wherein the flyback converter further includes:
   a secondary-side controller configured to process an output voltage for the flyback converter into an input current; and
   an optocoupler configured to convert the input current into an output current, wherein the primary-side controller is further configured to convert the output current into the control voltage.

4. The flyback converter of claim 1, wherein the logic circuit is further configured to activate a pulse frequency modulation mode for the flyback converter responsive to the control voltage being less than the adaptive control voltage threshold and greater than a pulse frequency mode threshold, and wherein the switching frequency generator is further configured to vary the switching frequency responsive to the control voltage while the pulse frequency modulation mode is active.

5. The flyback converter of claim 4, wherein the primary-side controller further includes:
   a first comparator configured to assert a first comparator output signal responsive to the control voltage being greater than the adaptive control voltage threshold, and wherein the logic circuit is further configured to activate the pulse width modulation mode responsive to an assertion of the first comparator output signal.

6. The flyback converter of claim 5, wherein the primary-side controller further includes:
   a second comparator configured to assert a second comparator output signal responsive to the control voltage being greater than the pulse frequency mode threshold, and wherein the logic circuit is further configured to activate the pulse frequency modulation mode responsive to an assertion of the second comparator output signal while the first comparator output signal is not asserted.

7. The flyback converter of claim 4, wherein the logic circuit is further configured to activate a deep pulse width modulation mode for the flyback converter responsive to the control voltage being less than the pulse frequency mode threshold and greater than a burst mode threshold.

8. The flyback converter of claim 7, wherein the logic circuit is further configured to activate a burst modulation mode for the flyback converter responsive to the control voltage being less than the burst mode threshold.

9. A method of operation for a flyback converter, comprising:
   converting an output voltage for the flyback converter into an adaptive control voltage threshold that varies with the output voltage;
   modulating a power switch for the flyback converter in a pulse width modulation mode responsive to a control voltage for the flyback converter being greater than the adaptive control voltage threshold; and
   modulating the power switch in a pulse frequency modulation mode responsive to the control voltage being less than the adaptive control voltage threshold and greater than a pulse frequency modulation mode threshold.

10. The method of claim 9, wherein converting the output voltage into the adaptive control voltage is responsive to a linear function of the output voltage.

11. The method of claim 9, further comprising: controlling a switching frequency for the power switch to equal a constant value during the pulse width modulation mode.

12. The method of claim 11, wherein the constant value is a function of the adaptive control voltage threshold.

13. The method of claim 9, further comprising:
   modulating the power switch in a deep pulse width modulation mode responsive to the control voltage being less the pulse frequency modulation mode threshold and greater than a burst mode threshold.

14. The method of claim 13, further comprising:
   modulating the power switch in a burst modulation mode responsive to the control voltage being less than the burst mode threshold.

15. The method of claim 9, further comprising:
   processing a collector current from an optocoupler to generate the control voltage.

16. The method of claim 15, wherein the control voltage is proportional to the collector current.

17. The method of claim 15, wherein the control voltage is inversely proportional to the collector current.

* * * * *